United States Patent
Hsu et al.

(10) Patent No.: US 6,847,277 B2
(45) Date of Patent: Jan. 25, 2005

(54) TORSION SPRING FOR ELECTRO-MECHANICAL SWITCHES AND A CANTILEVER-TYPE RF MICRO-ELECTROMECHANICAL SWITCH INCORPORATING THE TORSION SPRING

(75) Inventors: Tsung-Yuan Hsu, Westlake Village, CA (US); Robert Loo, Agoura Hills, CA (US); Adele Schmitz, Newbury Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 10/844,271

(22) Filed: May 11, 2004

(65) Prior Publication Data

US 2004/0207497 A1 Oct. 21, 2004

Related U.S. Application Data

(62) Division of application No. 10/097,632, filed on Mar. 12, 2002, now Pat. No. 6,768,403.
(60) Provisional application No. 60/275,171, filed on Mar. 12, 2001.

(51) Int. Cl.[7] .............................................. H01H 51/22
(52) U.S. Cl. ............................ 335/78; 335/80; 200/181
(58) Field of Search ..................... 335/78, 80; 200/181

(56) References Cited

U.S. PATENT DOCUMENTS

| | | | | |
|---|---|---|---|---|
| 4,959,515 A | * | 9/1990 | Zavracky et al. | ........... 200/181 |
| 5,121,089 A | | 6/1992 | Larson | |
| 5,578,976 A | * | 11/1996 | Yao | .............................. 333/262 |
| 5,629,565 A | * | 5/1997 | Schlaak et al. | .............. 257/780 |
| 5,638,946 A | * | 6/1997 | Zavracky | ..................... 200/181 |
| 6,040,748 A | | 3/2000 | Gueissaz | |
| 6,046,659 A | | 4/2000 | Loo et al. | |
| 6,057,520 A | * | 5/2000 | Goodwin-Johansson | .... 200/181 |
| 6,115,231 A | | 9/2000 | Shirakawa | |
| 6,153,839 A | * | 11/2000 | Zavracky et al. | ............ 200/181 |
| 6,229,683 B1 | * | 5/2001 | Goodwin-Johansson | .... 361/233 |
| 6,331,257 B1 | * | 12/2001 | Loo et al. | ....................... 216/13 |
| 6,440,767 B1 | * | 8/2002 | Loo et al. | ....................... 438/52 |
| 6,624,720 B1 | * | 9/2003 | Allison et al. | .............. 333/105 |
| 6,646,215 B1 | * | 11/2003 | Nelson | ........................ 200/181 |
| 6,768,403 B2 | * | 7/2004 | Hsu et al. | ...................... 335/78 |

FOREIGN PATENT DOCUMENTS

| | | |
|---|---|---|
| DE | 19807214 | 9/1999 |
| DE | 19820821 | 12/1999 |
| WO | 0109911 | 2/2001 |

* cited by examiner

Primary Examiner—Lincoln Donovan
Assistant Examiner—Bernard Rojas
(74) Attorney, Agent, or Firm—Tope-McKay & Associates

(57) ABSTRACT

A torsion spring for an electro-mechanical switch is presented. The torsion spring comprises a set of tines including at least one tine extending from the free end of the armature of a switch. A terminus portion is rotatably suspended between the tines, and includes a conducting transmission line, at least a portion of which is exposed for electrical contact. The conducting transmission line has a length selected such that the exposed portion of the transmission line forms a circuit between the input and output of the micro-electro-mechanical switch when the micro-electro-mechanical switch is urged into a closed position, with the terminus portion rotating via the tines to form a conformal connection between the exposed portion of the conducting transmission line and the input and output of the switch, thus optimizing the electrical flow therebetween. The switch is also applied to MEMS devices.

26 Claims, 12 Drawing Sheets

TORSION SPRING FOR ELECTRO-MECHANICAL SWITCHES AND A CANTILEVER-TYPE RF MICRO-ELECTROMECHANICAL SWITCH INCORPORATING THE TORSION SPRING

PRIORITY CLAIM

This application claims the benefit of priority to the provisional Application Ser. No. 60/275,171, titled "Priority-Based Dynamic Slot Reservation for Airborne Supported Wireless Ad-hoc Networks" filed with the United States Patent and Trademark Office on Mar. 12, 2001 and is a DIV of the utility application Ser. No. 10/097,632, titled "Torsion Spring For Electro-Mechanical Switches And A Cantilever-Type RF Micro-Electromechanical Switch Incorporating The Torsion Spring" filed with the United States Patent and Trademark Office on Mar. 12, 2002 now U.S. Pat. No. 6,768,403.

BACKGROUND OF THE INVENTION (a) Technical Field of the Invention

The present invention generally relates to electro-mechanical switches, more particularly to micro-electromechanical switches (MEMS), and most particularly to high power RF MEMS.

(b) Description of Related Art

In communications applications, switches are often designed with semiconductor elements such as transistors or pin diodes. At microwave frequencies, however, these devices suffer from several shortcomings. Pin diodes and transistors typically have an insertion loss greater than 1 dB, which is the loss across the switch when the switch is closed. Transistors operating at microwave frequencies tend to have an isolation value less than 20 dB. This allows a signal to 'bleed' across the switch even when the switch is open. Pin diodes and transistors have a limited frequency response and typically only respond to frequencies below 20 GHz. In addition, the insertion losses and high isolation value for these switches vary depending on the frequency of the signal passing through the switches. These characteristics make semiconductor transistors and pin diodes a poor choice for switches in microwave applications.

U.S. Pat. No. 5,121,089, to Larson, disclosed a new class of microwave switch—the micro-electro-mechanical (MEM) switch. The MEM switch has a very low insertion loss (less than 0.2 dB at 45 GHz) and a high isolation when open (greater than 30 dB). In addition, the switch has a large frequency response and a large bandwidth compared to semiconductor transistors and pin diodes. These characteristics give the MEM switch the potential to replace traditional narrow-bandwidth PIN diodes and transistor switches in microwave circuits.

The Larson MEM switch utilizes an armature design. One end of a metal armature is affixed to an output line, and the other end of the armature rests above an input line. The armature is electrically isolated from the input line when the switch is in an open position. When a voltage is applied to an electrode below the armature, the armature is pulled downward and contacts the input line. This creates a conducting path between the input line and the output line through the metal armature.

Micro-electromechanical switches of the general type described above are, however, prone to premature failure. The cause of the premature failure is linked to the damage resulting from the impact of the armature contact with the substrate contact. This damage is exacerbated by the fact that conventional MEM switches have armature contacts that impinge on the substrate contact surface at an angle. The angled impact results in all the impact energy being transferred to a relatively small area, thereby ultimately causing premature failure due to both increased impact per unit area and heat caused by resistive heating due to increased current density through the small area of actual contact.

SUMMARY OF THE INVENTION

The present invention solves this and other problems by providing a torsion spring which is configured to result in a substantially conformal contact between the contact plates. The resultant MEMS has increased durability, and because the substantially conformal contact results in a better electrical contact, there is less heating and the MEM switch can handle more power. Thus, a more durable and versatile MEM switch results.

One embodiment of the present invention provides an armature mounted torsion spring, wherein the torsion spring is configured to provide sufficient flexibility such that when an armature electrode is electromechanically brought into contact with a substrate electrode the electrodes provide substantial conformity with one another and thus maximize contact area, reduce wear and reduce Ohmic resistance.

This invention provides a new RF MEM switch in which the RF line is loaded with a torsion spring to achieve a conformal metal to metal contact. A conformal metal to metal contact assures a maximum contact area and lowest contact resistance, and, therefore, provides for critical long term reliability and good heat dissipation thus allowing for improved high-power handling.

In another embodiment, the present invention provides a torsion spring for an electro-mechanical switch. The torsion spring comprises a set of tines with the set of tines having at least one tine. The set of tines extends from a free end of the armature of the switch, and includes a terminus portion rotatably suspended between the tines. The terminus portion includes a conducting transmission line, at least a portion of which is exposed for electrical contact. The conducting transmission line have a length selected such that the exposed portion of the transmission line forms a circuit between the input and output of the micro-electro-mechanical switch when the micro-electro-mechanical switch is urged into a closed position. When the switch closes, the terminus portion rotates via the tines to form a conformal connection between the exposed portion of the conducting transmission line and the input and output of the switch, thus optimizing the electrical flow therebetween.

In another embodiment of the torsion spring, the portion of the conducting transmission line exposed for electrical contact is in the form of a plurality of dimples. Each dimple corresponds to the contact to be made with the input and the output, respectively. The dimples combined with the rotatable nature of the terminus provide a conformal contact between the conducting transmission line and the input and the output to form a circuit therebetween.

The torsion spring is preferably constructed of a material selected from a group consisting of silicon nitride, Type III-V semiconductor materials, and silicon dioxide. The conducting transmission line is preferably formed from a titanium adhesive layer and a gold conductor layer.

The set of tines of the torsion spring preferably includes a plurality of tines, and more preferably includes two tines.

In another embodiment, the present invention provides a micro-electro-mechanical switch comprising a substrate with an input line, an output line, and a substrate electrode formed on the top of the substrate, all separated from each other. The switch further includes an armature having a first beam structural layer with a first end mechanically connected with the substrate and a second end including a set of tines with at least one tine. A terminus portion is suspended between the tines, and includes a conducting transmission line positioned over the input and output lines. At least a portion of the conducting transmission line is exposed for conformal contact with the input and output lines. The armature further includes an armature electrode positioned directly above the substrate electrode and suspended on the armature. An insulating layer is positioned between the armature electrode and the substrate electrode to prevent short-circuiting therebetween. Thus, when the switch is actuated into a "closed" position, the terminus is free to rotate to ensure a conformal contact between the exposed portion of the conducting transmission line and the input and output lines in order to form a circuit therebetween to permit the flow of electricity.

The armature of the switch is preferably modified with the same enhancements discussed relative to the torsion spring embodiment above.

In another embodiment of the micro-electro-mechanical switch, the insulating layer is formed as a second beam structural layer under the armature electrode. The first and the second beam structural layers are formed of materials selected such that their mechanical and thermal properties provide a desired amount of bowing when the switch is activated.

Another embodiment of the present invention provides an armature for a micro-electro-mechanical switch having a torsion spring. The armature comprises a first beam structural layer having a first end for mechanically connecting with a substrate of a micro-electro-mechanical switch and a second end including a set of tines including at least one tine. A terminus portion is suspended between the tines, and includes a conducting transmission line configured to be positioned over the input and output lines of a micro-electro-mechanical switch. At least a portion of the conducting transmission line is exposed for conformal contact with the input and output lines. An armature electrode is directly above a substrate electrode of the micro-electro-mechanical switch and suspended on the armature, and an insulating layer is positioned between the armature electrode and the substrate electrode to prevent short-circuiting therebetween when the armature is assembled in a micro-electro-mechanical switch and actuated into a closed position. When the armature is assembled in a micro-electro-mechanical switch and is actuated into a "closed" position, the terminus is free to rotate to ensure a conformal contact between the exposed portion of the conducting transmission line and the input and output lines in order to form a circuit therebetween to permit the flow of electricity.

The armature is preferably modified with the same enhancements discussed relative to the torsion spring embodiment above.

In another embodiment of the armature, the insulating layer is formed as a second beam structural layer under the armature electrode, with the first and the second beam structural layers formed of materials selected such that their mechanical and thermal properties provide a desired amount of bowing when the switch is activated.

BRIEF DESCRIPTION OF THE DRAWINGS

The advantages set forth in the SUMMARY above, and other features and advantages will become more apparent from a detailed consideration of the invention when taken in conjunction with the drawings in which.

DESCRIPTION OF THE PREFERRED EMBODIMENT

Figure 1:
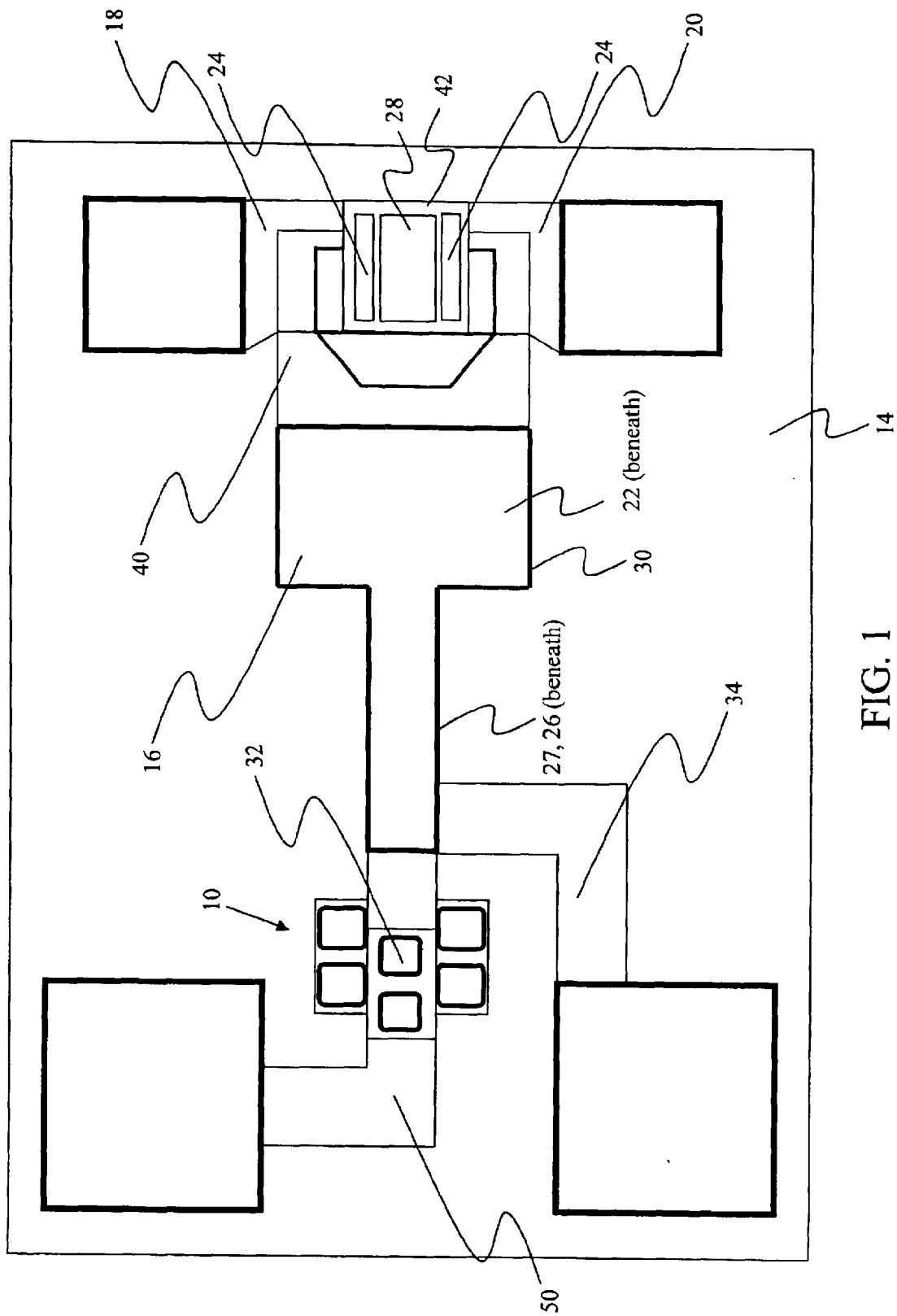
FIG. 1 is a top overview of an alternative embodiment of a MEM switch embodying the present invention, wherein the conducting transmission line is positioned over both the input line and the output line.

The present invention generally relates to electro and micro-electro-mechanical switches (MEMS), and more particularly to a torsion spring for providing improved input/output contact in high power RF MEMS. The following description, taken in conjunction with the referenced drawings, is presented to enable one of ordinary skill in the art to make and use the invention and to incorporate it in the context of particular applications. Various modifications, as well as a variety of uses in different applications, will be readily apparent to those skilled in the art, and the general principles defined herein, may be applied to a wide range of embodiments. Thus, the present invention is not intended to be limited to the embodiments presented, but is to be accorded the widest scope consistent with the principles and novel features disclosed herein. Furthermore it should be noted that unless explicitly stated otherwise, the figures included herein are illustrated diagrammatically and without any specific scale, as they are provided as qualitative illustrations of the concept of the present invention.

This invention teaches a torsion spring to assure a conformal contact between the armature contact and the electrodes in electro-mechanical switches, and has particular use with MEMS. The conforming nature of the contact provided by the present invention is intended to maximize the available contact area so that the contact resistance is minimized, and heat dissipation is improved. The existing simple cantilever beam type of RF MEMS switch such as the RF switch disclosed in U.S. Pat. No. 6,046,659 which is herein incorporated for all that it discloses, is an example of a switch having the disadvantages of making edge contact as the switch is snapped down. The contact area in this older switch is usually around 10 microns$^2$ of the total dimple (contact plate) size of greater than 100 microns$^2$. The impact of the contact of the electrode with the edge of the dimple can result in excessive wear and premature failure. This excessive wear is the primary limiting factor to the number of cycles that the switch will accommodate prior to failure. The present invention simultaneously increases the switch cycle-lifespan and substantially increases the switch's power handling capacity, as compared to conventional RF switches.

The switch can be fabricated using existing fabrication processes including those disclosed in U.S. Pat. No. 6,046, 659. Reliability studies on existing RF MEM switches indicate that a dominant factor limiting the switch cycling times is the nature of the edge contact of dimples upon actuation. Edge contact allowed less than 10% of the dimple surface to touch the electrode. This limitation on contact area results in a two-fold problem: First, a smaller contact area necessarily results in greater impact related damage on the switching system, resulting in part from a concentrated point of impact, and second, the smaller contact area results in an inferior connection and an associated increase in Joule (resistive) heating, which can also contribute to premature failure and inferior performance. The larger contact area provided by the present invention results in superior contact, better heat dissipation and power handling and simultaneously reduces the impact related damage at the point of contact.

The improved reliability and power handling capability of the present design is achieved with the addition of a torsion spring, configured to provide the dimple contact with a freedom of rotation. Experimental results have shown that this structure reduces the likelihood of premature impact-related failure and also assures conformal dimple contact, thus minimizing contact resistance. Additionally, this type of switch has an improved power-handling capability, as heat dissipation is improved by the much larger contact area.

FIG. 1 depicts a top view of an embodiment of a microelectro-mechanical (MEM) switch 10 according to the present invention. In this embodiment, a conducting transmission line 28 is between first and second beam structural layers 26 and 27 and is not connected directly to either the input line 20 or the output line 18. An armature bias electrode 30 covers a large portion of the underside of the armature 16 and the area between the beam structural layers 26 and 27. One end of the armature 16 is affixed directly to the substrate 14. The free end of the armature 16, beyond the armature bias electrode 30, is bifurcated, forming a pair of tines 40, with a terminus portion 42 rotatably supported on the tines 40 and resting across a gap between the input line 18 and the output line 20. The conducting transmission line 28 is positioned on the terminus portion 42 of the armature 16, so that it can bridge the gap between the input line 20 and the output line 18 when the switch 10 is closed. When a voltage is applied between the substrate bias electrode 22 and the armature bias electrode 30, the armature 16 will bend towards the substrate 14. This forces the conducting transmission line 28 into electrical contact with both the input line 18 and the output line 20, thereby closing the switch. A signal can then pass from the input line 18 to the output line 20 through the conducting transmission line 28.

Figure 2A:
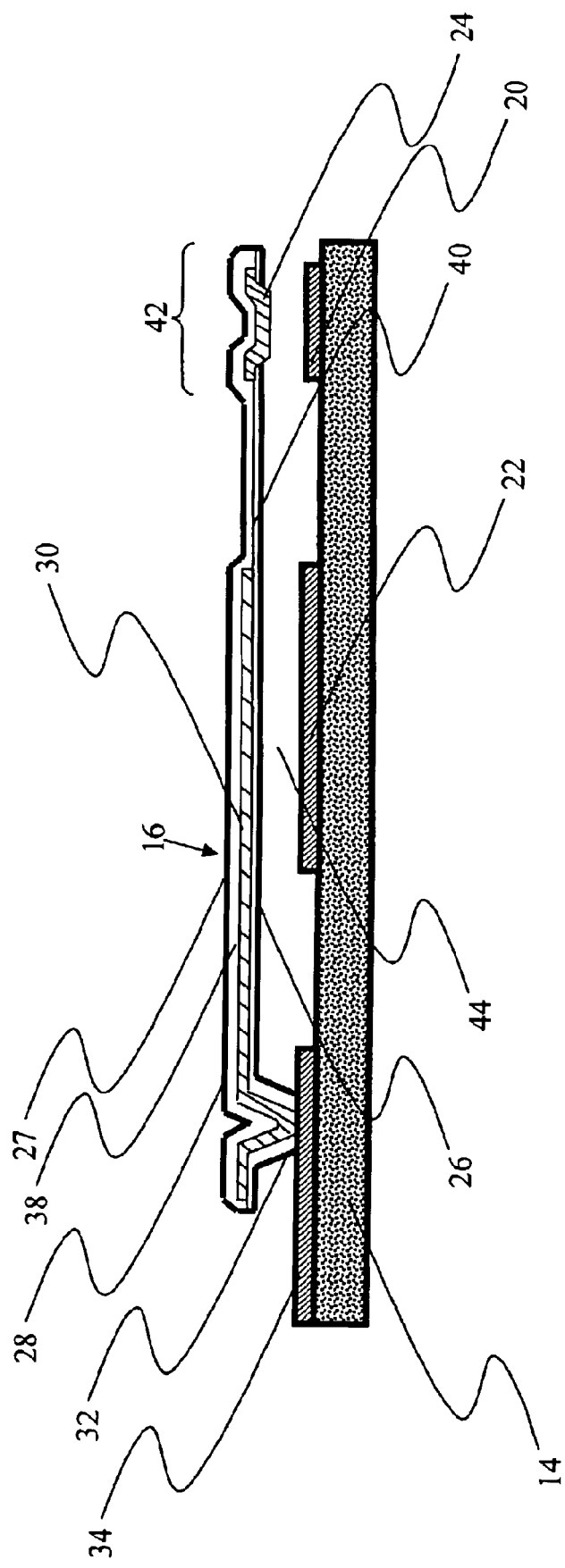
FIG. 2A shows a side elevation view of the MEM switch depicted in FIG. 1.
Figure 2B:
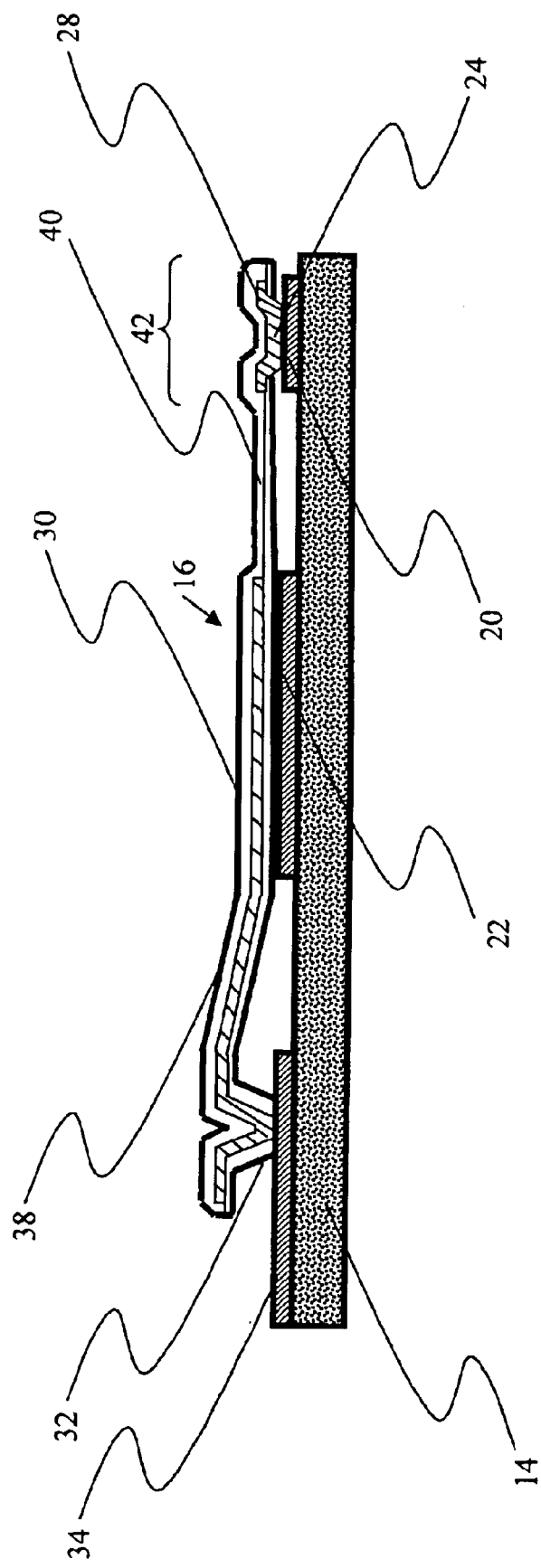
FIG. 2B is the MEMS switch of FIG. 2A in a closed position.

FIGS. 2A and 2B are side-elevational views of the MEMS switch 10 shown in FIG. 1. FIG. 2A depicts the MEMS switch in an "open" state and FIG. 2B depicts it in a "closed" state. The beam structural material 26 is connected to the substrate 14 through the fixed anchor vias 32. The suspended armature bias electrode 30 is nested within the structural material between layers 26 and 27, and is electrically accessed via contact between the bias line 38 and the armature bias pad 34. The conducting transmission line 28 is at the free end of the beam structural layers 26 and 27 and is electrically isolated from the suspended armature bias electrode 30 by the (dielectric) beam structural layers 26 and 27. The conducting transmission line 28 is provided with a pair of dimples 24 so that when the switch 10 is closed, the combination of the dimples 24 and the transmission line 28 form a conductive pathway between the input line 18 and the output line 20, allowing electricity to flow therethrough. The gap between the dimples 24 and the substrate 14 is less than the distance between the first structural layer 26 and the substrate 14. The transmission line 28 and the dimples 24 are preferably encased within the terminus portion 42 of the armature 16, which is suspended by the tines 40. The tines 40 provide a portion of the armature 16 that is sufficiently flexible to permit the terminus portion 42 to rotate in order to ensure a conforming contact between the dimples 24 and the input line 18 and the output line 20. Variations in the thickness and shape of the tines 40 can be used to provide desirable "spring" properties. Additionally, the placement of the attachment between the tines 40 and the terminus portion 42 can be varied in order to accommodate a desired degree and direction of rotation to ensure a conformal contact between the dimples 24 and the input line 18 and the output line 20 in order to optimize the flow of electricity. Furthermore, depending on the particular embodiment and the degree of rotational freedom desired, the number of tines used may vary from one to as many as practical for a particular application. Note that the tines 40 must be sufficiently rigid to ensure that they resume their former shape after bending to provide the conforming contact. If they are formed too rigidly, depending on the closure force exerted on the switch 10, a brittle fracture may result. The suspended contact dimples 24 extend through and below the first beam structural layer 26 and define the areas of metal contact for the input and output lines 18 and 20, respectively. The substrate bias electrode 22 is below the suspended armature bias electrode 30 on the surface of the substrate 14, and is separated therefrom by an air gap 44. When a voltage is applied between the suspended armature bias electrode 30 and the substrate bias electrode 22, an electrostatic attractive force pulls the suspended armature bias electrode 30, along with the attached armature 16, toward the substrate bias electrode 22. In action, the dimple 24 first contacts the input line 18, at which point the armature 16 bends to allow the suspended armature bias electrode 30 to approach the substrate bias electrode 22. As a result, the suspended contact dimples 24 touch the input line 20 and the output line 18, so the conducting transmission line 28 bridges the gap between the input line 18 and the output line 20 thereby closing the MEM switch 10 to the position shown in FIG. 2B. Thus, the force of the metallic contact between the dimple 24 and the input line 18 is primarily dependent on the flexibility of the tines 40 and the geometry of the dimple 24, and not on the attractive forces of the armature electrode 30 to the substrate electrode 22.

It is worth noting that metallic switches that do not have contact dimples have contacts that depend on armature flexibility and bias strength, factors which vary with the temperature, age, and the amount of use of the MEM switch. In addition to improving repeatability, the quality of the contact itself is improved by the addition of the dimple because the dimple has a controllable size and surface texture, characteristics that are dependent on the fabrication rather than on the environment. Thus, MEM switches without the dimple 24 are more likely to have time-varying contact characteristics, a feature that may make them difficult or impossible to use in some circuit implementations.

Figure 3A:
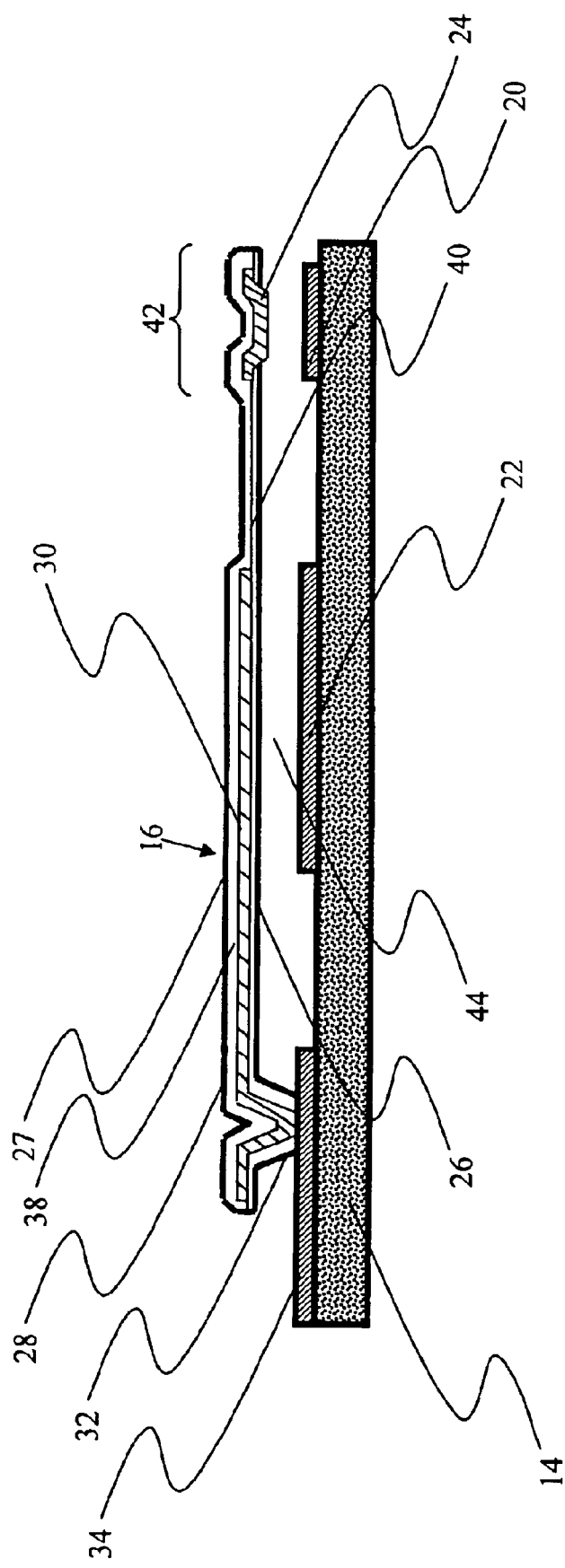
FIGS. 3A and 3B are side elevation views of an alternative embodiment of the MEM switch depicted in FIG. 1 wherein the ordering of the layers comprising the armature is altered.
Figure 3B:
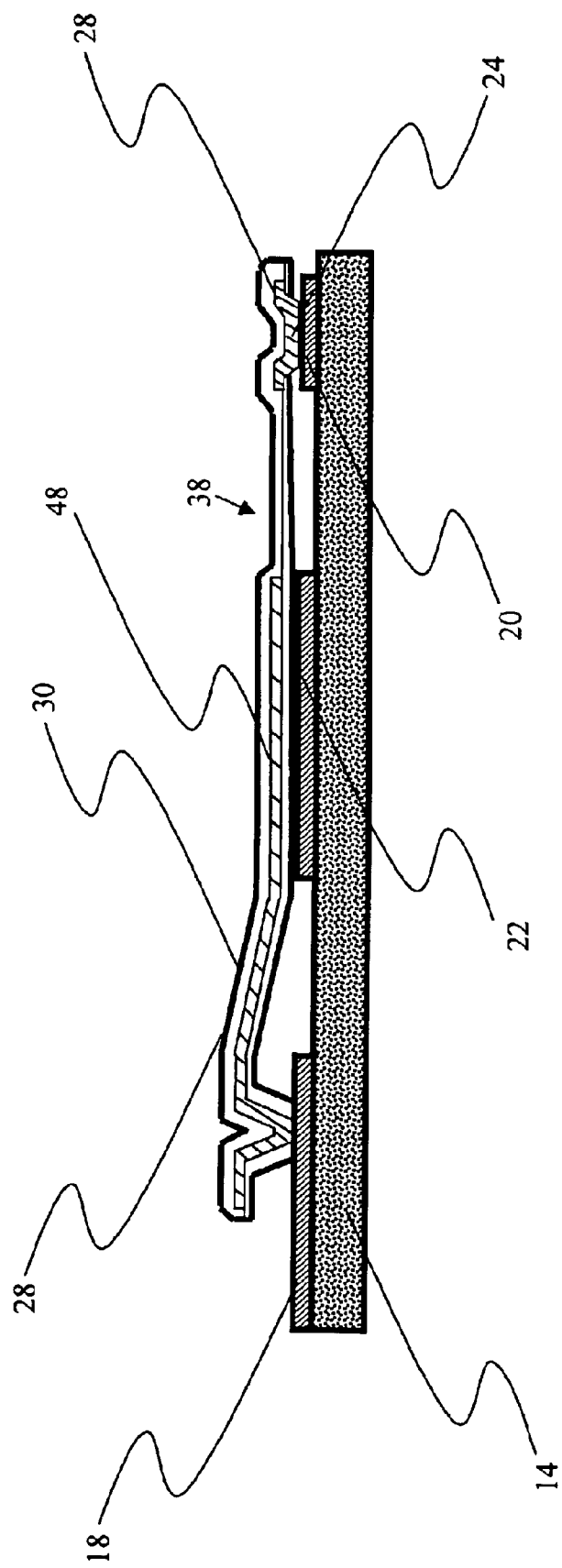

FIGS. 3A and 3B are side-elevational views of an alternative embodiment of the MEMS 10 in FIG. 1, FIG. 2A, and FIG. 2B. In this case, the suspended armature bias electrode 30 is an exposed layer on the bottom of the armature 16. Because of the exposed nature of the suspended armature bias electrode 30, an additional insulating layer 48 is provided on top of the substrate bias electrode 22 to keep the armature bias electrode 30 and the substrate bias electrode 22 from becoming electrically shorted when the switch is in the closed position.

FIGS. 5A–5F illustrate a manufacturing process that may be employed for fabricating the MEM switch 10 of FIGS. 1 and 2. The process begins with a substrate 14. In a preferred embodiment, GaAs is used as the substrate. Other materials may be used, however, such as InP, ceramics, quartz, or silicon. This allows the circuit elements as well as the MEM switch 10 to be fabricated simultaneously on the same substrate using standard integrated circuit fabrication technology such as metal sputtering and masking. The substrate is chosen primarily based on the technology of the circuitry and the MEM switch is to be connected with so that the MEM switch and the circuit may be fabricated simultaneously. For example, InP can be used for low noise HEMT MMICS (high electron mobility transistor monolothic microwave integrated circuits) and GaAs is typically used for PHEMT (pseudomorphic HEMT) power MMICS. The flexibility in the fabrication of the MEM switch 10 allows it to be used in a variety of circuits. This reduces the cost and complexity of circuits designed using the present MEM switch.

Figure 4A:
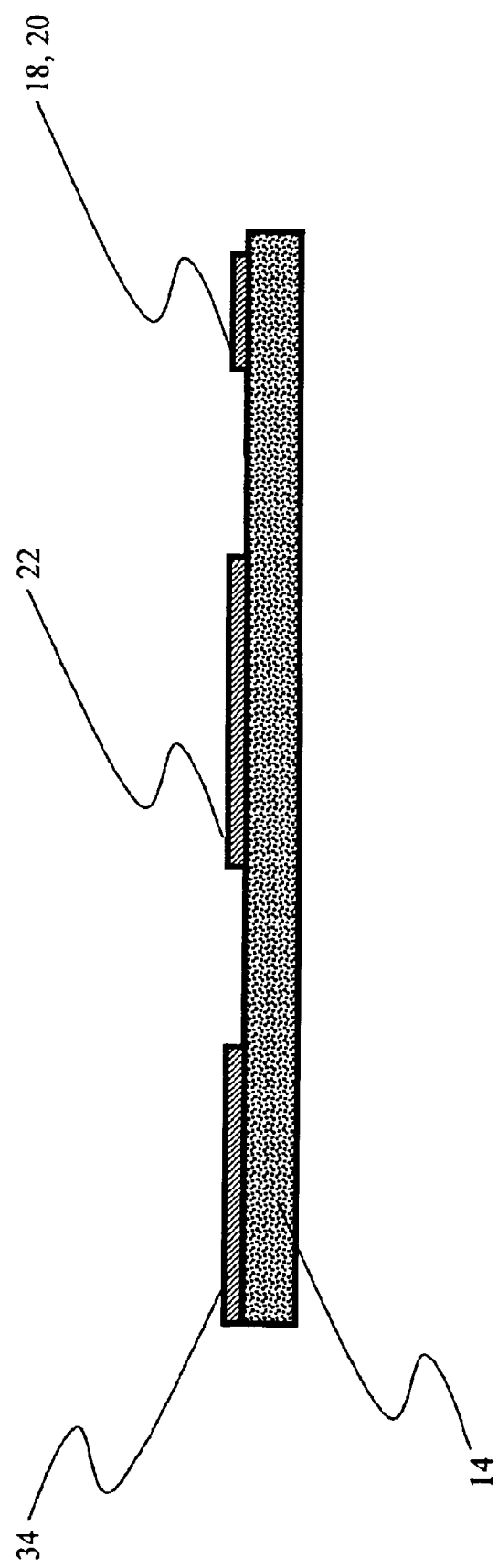
FIGS. 4A–4F are side elevation views of the MEM switch of FIG. 1 during progressive steps of a fabrication process further embodying the present invention.

FIG. 4A shows a profile of the MEM switch 10 after the first step of depositing a metal layer onto the substrate 14 for the armature bias pad 34, the input and output lines 18 and 20, and the substrate bias electrode 22 is complete. The metal layer may be deposited lithographically using standard integrated circuit fabrication technology, such as resist lift-off or resist definition and metal etch. In the preferred embodiment, gold (Au) is used as the primary composition of the metal layer. Au is preferred in RF applications because of its low resistivity. In order to ensure the adhesion of the Au to the substrate, a thin layer (250–500 angstroms) of titanium (Ti) is deposited, followed by an approximately 1000 angstrom layer of platinum (Pt), and finally the Au. The Pt acts as a diffusion barrier (an anti-diffusion layer) to keep the Au from intermixing with the Ti and causing the metal to lose adhesion strength to the substrate. Other anti-diffusion layer materials may be used, depending on the needs of a particular embodiment. In the case of a III-V semiconductor substrate, a thin layer of gold germanium (AuGe) eutectic metal may be deposited first to ensure adhesion of the Au by alloying the AuGe into the semiconductor similar to a standard ohmic metal process for any III-V MESFET or HEMT.

Figure 4B:
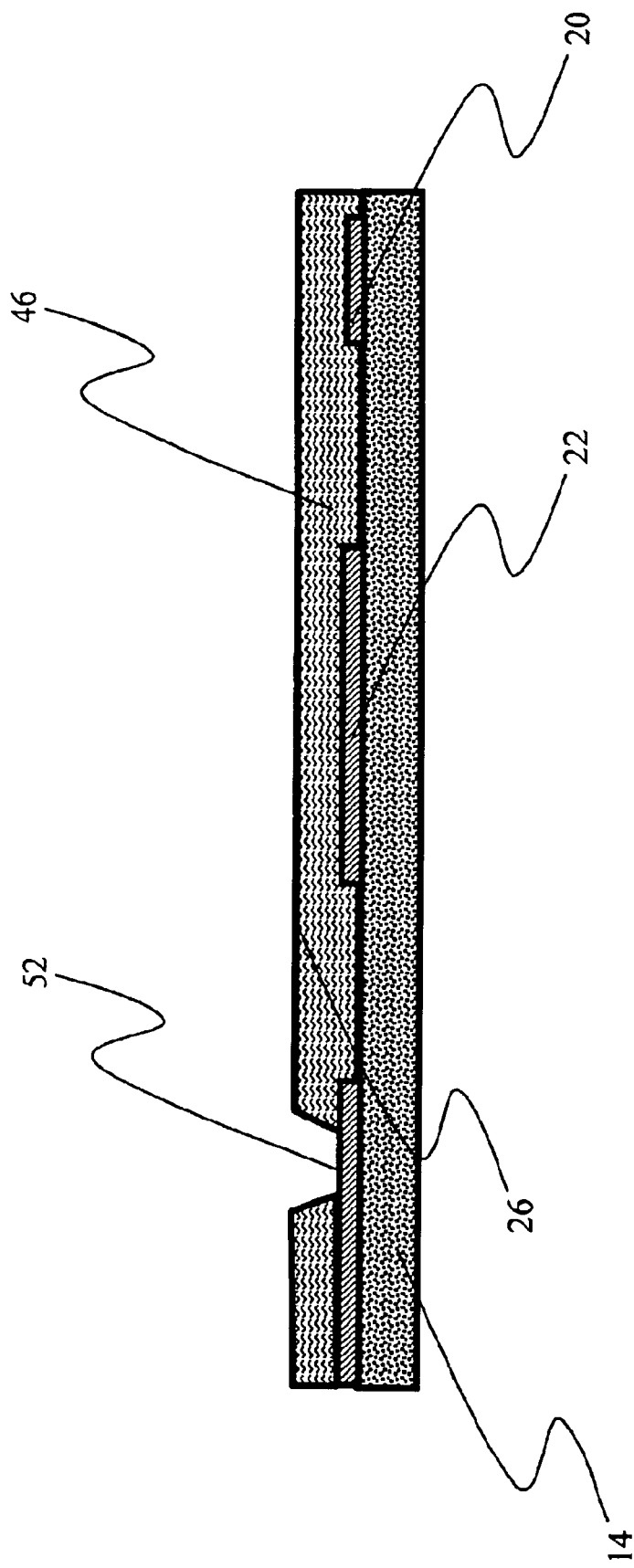

Next, as shown in FIG. 4B, a sacrificial layer 46 is placed on top of the metal layer (preferably Au) and etched so that the armature 16 may be produced above the sacrificial layer 46. The sacrificial layer 46 is typically comprised of 2 microns of $SiO_2$ which may be sputter-deposited or deposited using PECVD (plasma enhanced chemical vapor deposition). A via hole 52 is etched in the sacrificial layer 46 so that the metal armature bias pad 34 is exposed in order to begin forming the fixed anchor vias 42. The via hole 52 definition may be performed using standard resist lithography and etching of the sacrificial layer 46. Other materials besides $SiO_2$ may be used as a sacrificial layer 46. The important characteristics of the sacrificial layer 46 are a high etch rate, good thickness uniformity, and conformal coating by the oxide of the metal already on the substrate 14. The thickness of the oxide partially determines the thickness of the switch opening (gap 44), which is critical in determining the voltage necessary to close the switch 10 as well as the electrical isolation of the switch 10 when it is open. The sacrificial layer 46 will be removed in the final step to release the armature 16, as shown in FIG. 5F.

Another advantage of using $SiO_2$ as the sacrificial layer 46 is that $SiO_2$ can withstand high temperatures. Other types of sacrificial layers, such as organic polyimides, harden considerably if exposed to high temperatures. This makes the polyimide sacrificial layer difficult to later remove. The sacrificial layer 46 is exposed to high temperatures when the silicon nitride for the beam structural layer is deposited, as a high temperature deposition is desired when depositing the silicon nitride to give the silicon nitride a lower BOE etch rate. A low BOE etch rate minimizes the amount of the first beam structural layer 26 that is lost when the $SiO_2$ is etched away.

Figure 4C:
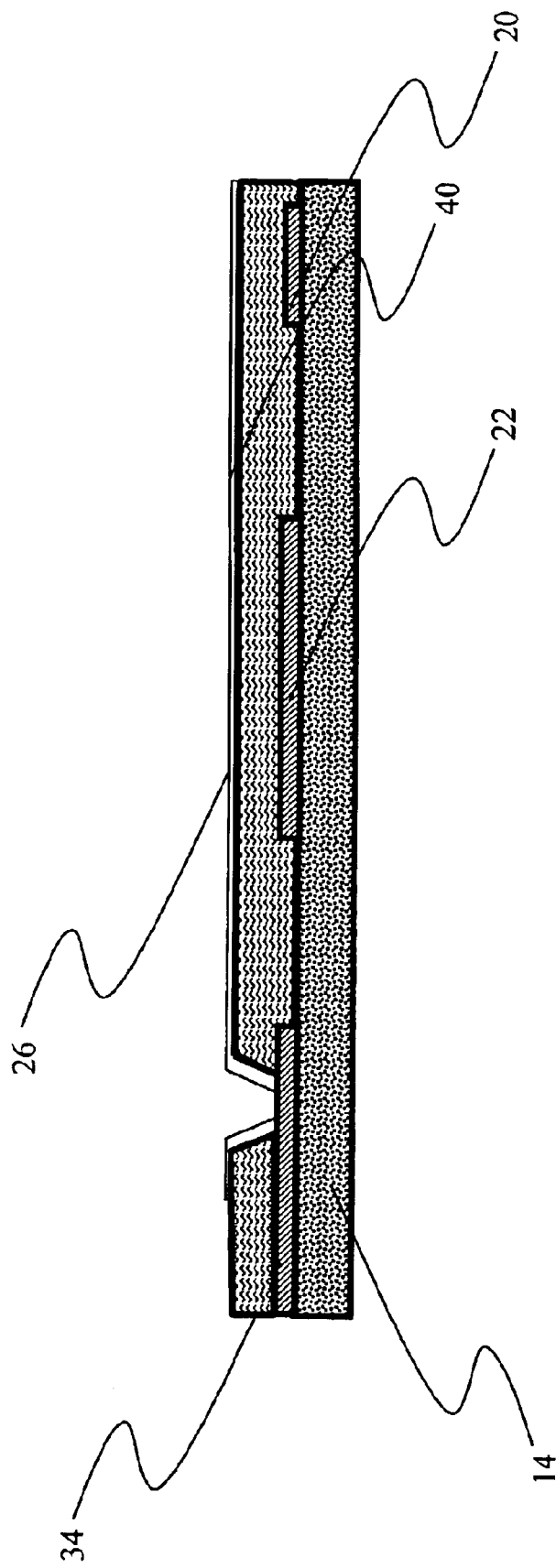

FIG. 4C shows the fabrication of the first beam structural layer 26. The first and second beam structural layers 26 and 27 provide the supporting mechanism of the armature 16 and are preferably made out of silicon nitride, although other materials besides silicon nitride may be used, examples of which include Type III-V semiconductor materials, and silicon dioxide. Silicon nitride is preferred because it can be deposited so that neutral stress exists in the beam structural layers 26 and 27. Neutral stress fabrication reduces the bowing that may occur when the switch is actuated. The material used for the first beam structural layer 26 must have a low etch rate compared to the sacrificial layer 46 so that the first beam structural layer 26 is not etched away when the sacrificial layer 46 is removed to release the armature 16. The first beam structural layer 26 is patterned and etched using standard lithographic and etching processes.

As depicted by the embodiment of FIGS. 3A and 3B, a beam structural layer 26 may be formed either below or above the armature bias electrode 30. If a beam structural layer 26 is fabricated on only one side of the armature bias electrode 30, bowing will occur in the armature 16 when the switch is actuated if the stress in the beam structural layer 26 differs from the stress in the armature bias electrode 30. The armature 16 will bow either upward or downward, depending upon which material has the higher stress. Bowing can change the voltage required to activate the switch and, if the bowing is severe enough, can prevent the switch from either opening (bowed downward) or closing (bowed upward) regardless of the actuating voltage. Therefore, it is preferable to match the stress levels of the layer of the armature bias electrode 30 with beam structural layer 26 (and 27, if applicable). Note, however, that the torsion spring-quality of the present invention provided by the tines 40 and the terminus portion 42 can aid to some degree in countering bowing when necessary.

The beam structural layer may also be formed both above and below the armature bias electrode 30, as previously discussed relative to FIG. 2, as a first beam structural layer 26 and a second beam structural layer 27 in order to minimize the bowing in the armature 16. By fabricating the beam structural layers 26 and 27 on both sides of the armature bias electrode 30, the effect of differing material stresses is minimized because the second beam structural layer 27 is above the armature bias electrode 30, and will flex in the same manner as the first beam structural layer 26 (below the armature bias electrode 30). The armature bias electrode 30 is constrained by the first and second beam structural layers 26 and 27, and will therefore flex with the structural layers 26 and 27 so that the bowing in the switch is minimized. When two beam structural layers are used, it is preferable that they be constructed of the same material in order to provide a desired minimum level of bowing of the switch. However, it is also feasible that combinations of different materials may be used to provide a customized level of bowing with the tines providing a degree of compensation for the bowing.

Figure 4D:
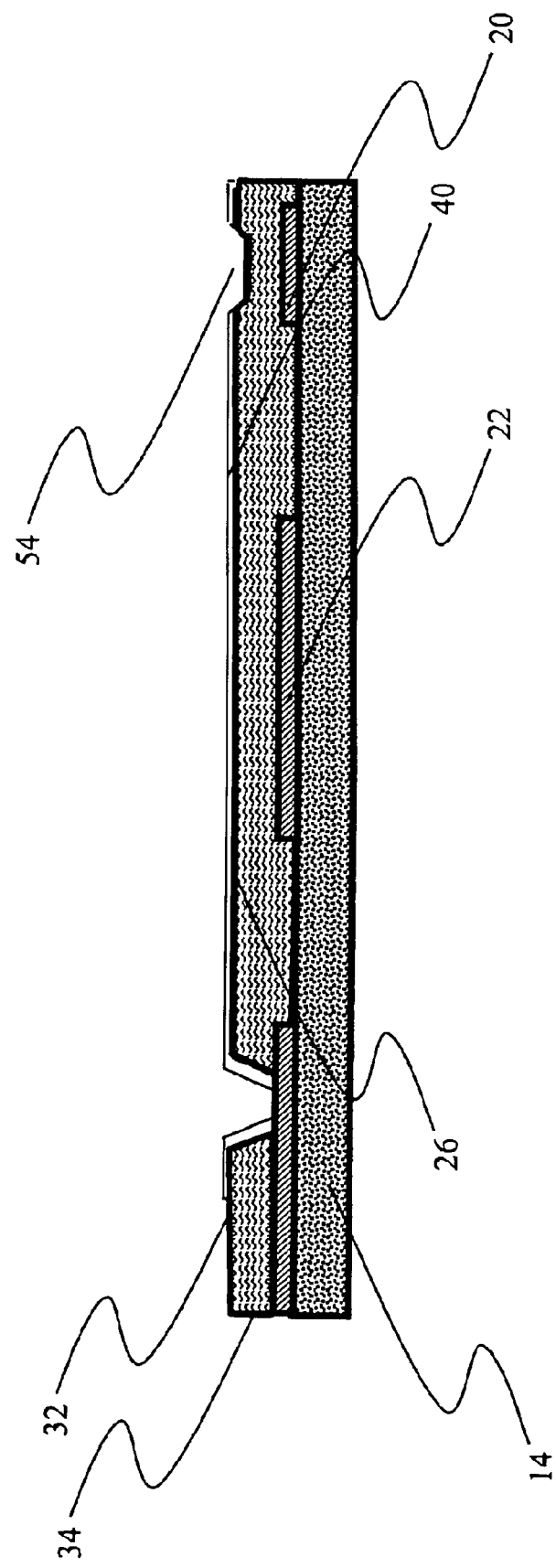
Figure 4E:
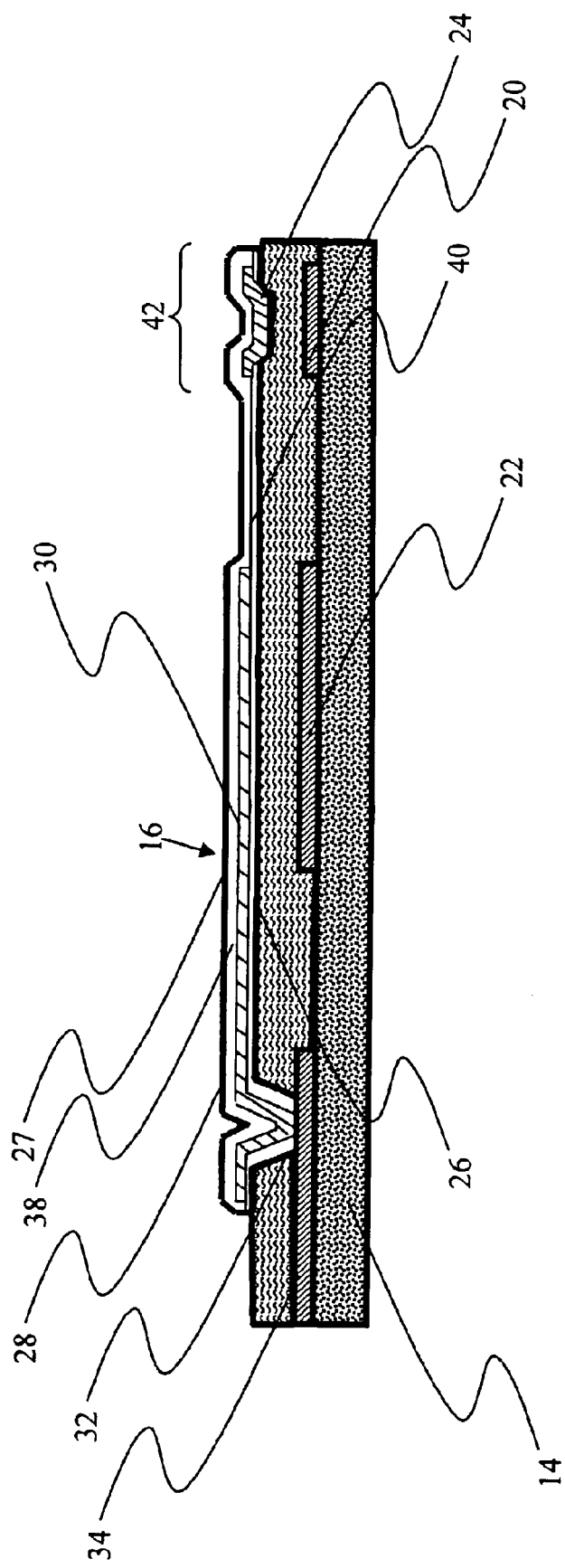

In FIG. 4D, a dimple receptacle 54 is etched into the first beam structural layer 26 and the sacrificial layer 46. The dimple receptacle 54 is an opening where the dimple 24 will later be deposited. The dimple receptacle 54 is created using standard lithography and a dry etch of the first beam structural layer 26, followed by a partial etch of the sacrificial layer 46. The opening allows the dimple to protrude through the first beam structural layer 26.

Next, a second metal layer forming the suspended armature bias electrode 30, the conducting line 28, and the dimples 24 is deposited onto the first beam structural layer 26. In the preferred embodiment, the metal layer is comprised of a sputter deposition of a thin film (200 angstroms) of Ti followed by a 1000 angstrom deposition of Au. The metal layer must be conformal across the wafer and acts as a plating plane for the Au. The plating is done by using metal lithography to open up the areas of the switch that are to be plated. The Au is electroplated by electrically contacting the membrane metal on the edge of the wafer and placing the metal patterned wafer in the plating solution. The plating occurs only where the membrane metal is exposed to the plating solution to complete the electrical circuit and not where the electrically insulating resist is left on the wafer. After 2 microns of Au is plated, the rest is stripped off of the wafer and the whole surface is ion milled to remove the membrane metal. Some Au will also be removed from the top of the plated Au during the ion milling, but the loss is minimal because the membrane is only 1200 angstroms thick.

The result of this process is that the armature bias electrode 30, the conducting transmission line 28, and the dimple 24 are created in the second metal layer, primarily Au in the preferred embodiment. In addition, the Au fills the via hole 52 and connects the armature bias electrode 30 to the armature bias pad 34. Au is a preferred choice for second metal layer because of its low resistivity. When choosing the metal for the second layer and the material for the beam structural layers 26 and 28, it is important to select the materials such that the stress of the beam structural layers 26 and 28 match the stress of the armature bias electrode 30 and the conducting transmission line 28 so that the armature 16 will not bow upwards or downwards when actuating. This is done by carefully determining the deposition parameters for the structural layer. Silicon nitride was chosen for this structural layer not only for its insulating characteristics but in large part because of the controllability of these deposition parameters and the resultant stress levels of the film. Also note that in order to electrically isolate the armature bias electrode 30 from the conducting transmission line 28, a portion of the second metal layer therebetween must be removed. In cases where both a first beam structural layer 26 and a second beam structural layer 27 are used, this process must be performed before depositing the second beam structural layer 27 on the armature bias electrode 30.

After deposition of the second beam structural layer 27, it is lithographically defined and etched to complete the switch fabrication. Finally, the sacrificial layer 46 is removed to release the armature 16. Furthermore, the portion of the beam structural layers 26 and 27 forming the tines 40 and the terminus portion 42 is etched in order to provide a desired thickness.

Figure 4F:
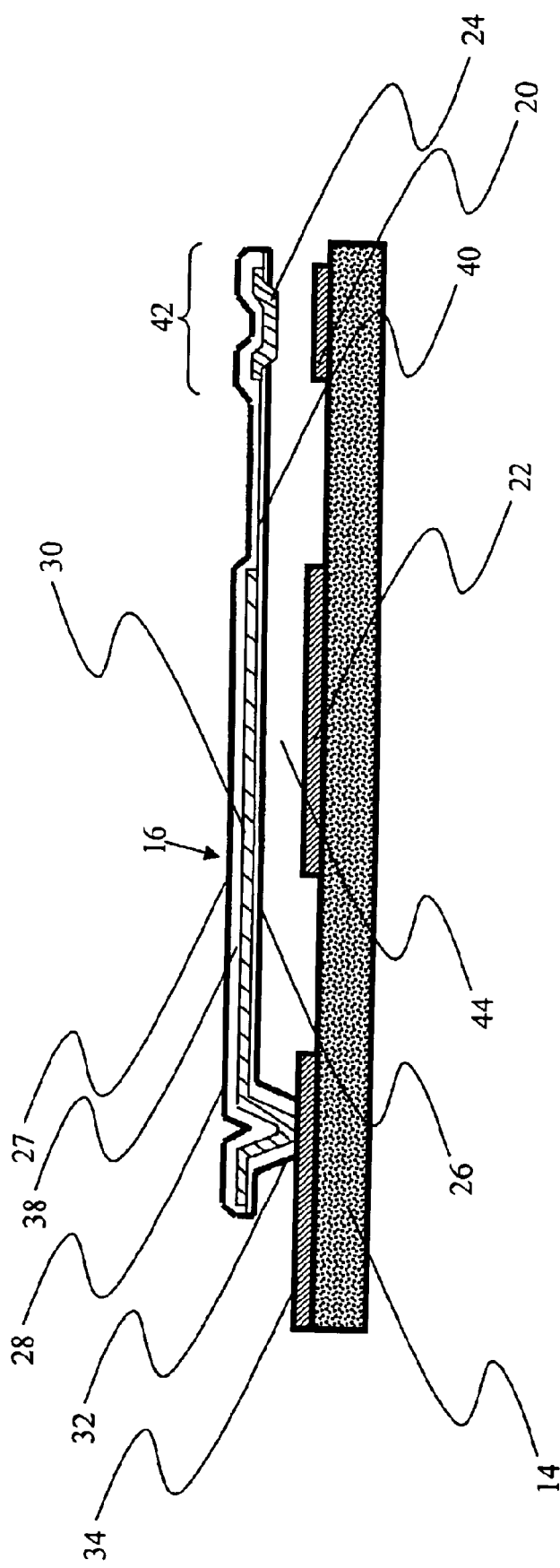

If the sacrificial layer is comprised of $SiO_2$, then it will typically be wet etched away in the final fabrication sequence by using a hydrofluoric acid (HF) solution. It is noteworthy that small fluid-flow holes may be formed through the layers, particularly where the armature bias electrode 30 portion of the armature 16 has a large area and in the terminus portion 42 of the armature 16 in order to permit smooth and even flow of the removal liquids to the sacrificial layer 46 to optimize the removal process. The etch and rinses are performed with post-processing in a critical point dryer to ensure that the armature 16 does not come into contact with the substrate 14 when the sacrificial layer 46 is removed. If contact occurs during this process, device sticking and switch failure are likely. Contact is prevented by transferring the switch from a liquid phase (e.g. HF) environment to a gaseous phase (e.g. air) environment not directly, but by introducing a supercritical phase in between the liquid and gaseous phases. The sample is etched in HF and rinsed with DI water by dilution, so that the switch is not removed from a liquid during the process. DI water is similarly replaced with methanol. The sample is transferred to the critical point dryer and the chamber is sealed. High pressure liquid $CO_2$ replaces the methanol in the chamber, so that there is only $CO_2$ surrounding the sample. The chamber is heated so that the $CO_2$ changes into the supercritical phase. Pressure is then released so that the $CO_2$ changes into the gaseous phase. Once the sample is surrounded only by gas, it may be removed from the chamber into room air. A side elevational view of the MEM switch after the sacrificial layer 46 has been removed is shown in FIG. 4F.

Figure 5:
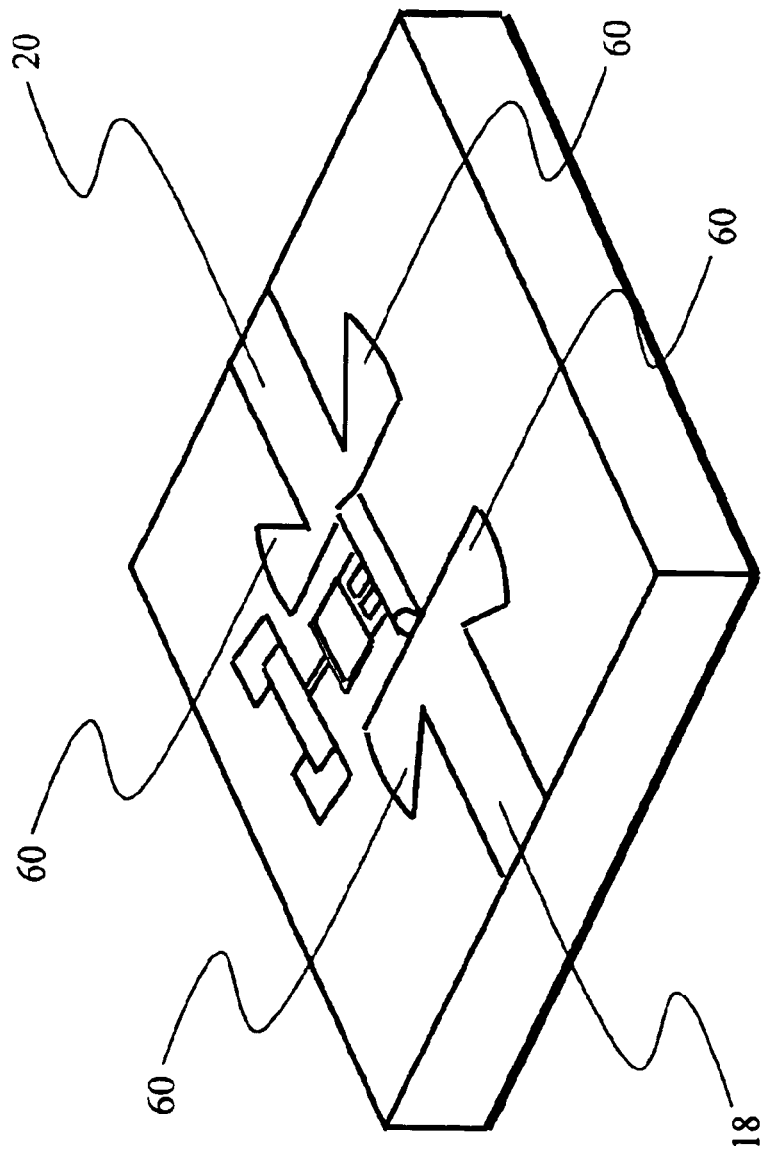
FIG. 5 is a MEM switch embodying the present invention, wherein the switch is configured with a shunt capacitance to match the MEM switch to a 50 ohm feed line.

FIG. 5 depicts a third MEM switch 10" where the MEM switch 10" is configured to be connected to a 50 ohm through line. The input line 18 and the output line 20 are segments of the 50 ohm through line. An impedance matching network, not needed when designed with short input and output lines, may be used to operate the switch 10" at frequencies greater than 5 GHz without generating reflections at the input line 20 or the output line 18. By itself, the switch 10" presents an inductive reactance when placed in series with the 50 ohm through line. In order to match the impedance of the switch 10" to the 50 ohm line, a shunt capacitance is added to the device. The shunt capacitance, in one embodiment of the design, can be realized by adding a microstrip radial stub 60 to both the input line 20 and the output line 18. The stubs 60 are angled away from the MEM switch to avoid series capacitive coupling between the stubs 60. Such series coupling would degrade the isolation of the MEM switch 10" in the open position. The resulting circuit acts as a lowpass filter for frequencies up to the low millimeter-wave range (approximately 40 GHZ). The capacitance values are chosen to maximize the cutoff frequency while maintaining a specified passband ripple.

In summary, in traditional armature MEMs, when the armature 16 flexes toward the input and output lines 18 and 20, drawn by a substrate bias electrode 22, the dimples 24 are unable to conformably contact the input and output lines 18 and 20 due to the angular deflection caused by bending of the armature 16. As a result, the dimples 24 have relatively poor contact with the input and output lines 18 and 20, with only about 10% of the surface area of the dimples 24 actually making contact. This poor contact results in mechanical wear as well as heading due to the flow of electricity through a small area. The present invention overcomes this problem by providing an armature-mounted torsion spring comprising a plurality of tines 40, attached with a terminus portion 42. The tines 40 permit rotation of the terminus portion 42 in order to maximize the conformal contact of dimples 24 on the terminus portion 42 with the an input line 18 and an output line 20 when the device is actuated in order to allow electricity to pass therethrough.

As can be surmised by one skilled in the art, there are many more configurations of the present invention that may be used beyond those presented herein. For example, other metals can be used to form the conducting transmission line layer, the bias electrodes and pads, and the input and output lines. The beam structural layers 26 and 27 and the sacrificial layer 46 may be fabricated with materials other than silicon nitride and silicon dioxide as long as suitable counterpart materials are selected. Other impedance-matching networks or circuitry can also be substituted for the radial stub embodiment shown. It is therefore intended that the foregoing detailed description be regarded as illustrative rather than limiting and that it be understood that it is the following claims, including all equivalents, are intended to define the scope of this invention.

What is claimed is:

1. An armature for a micro-electro-mechanical switch having a torsion spring, the armature comprising:

a first beam structural layer having a first end for mechanically connecting with a substrate of a micro-electro-mechanical switch and a second end including a set of tines including at least one tine with a terminus portion rotatably suspended therefrom, with the terminus portion including a conducting transmission line configured to be positioned over the input and output lines of a micro-electro-mechanical switch, with the at least a portion of the conducting transmission line exposed for conformal contact with the input and output lines; and an armature electrode positioned directly above a substrate electrode of the micro-electro-mechanical switch and suspended on the armature;

an insulating layer positioned between the armature electrode and the substrate electrode to prevent short-circuiting therebetween when the armature is assembled in a micro-electro-mechanical switch and actuated; whereby when the armature is assembled in a micro-electro-mechanical switch is actuated into a "closed" position, the terminus is free to rotate to ensure a conformal contact between the exposed portion of the conducting transmission line and the input and output lines in order to form a circuit therebetween to permit the flow of electricity.

2. An armature for a micro-electro-mechanical switch having a torsion spring as set forth in claim 1, wherein the insulating layer is formed as a second beam structural layer under the armature electrode, with the first and the second beam structural layers formed of materials selected such that their mechanical and thermal properties provide a desired amount of bowing when the switch is activated.

3. An armature for a micro-electro-mechanical switch having a torsion spring as set forth in claim 2, wherein the portion of the conducting transmission line exposed for electrical contact is in the form of a plurality of dimples, with a dimple corresponding to the contact to be made between the input and the output, respectively; whereby the dimples combined with the rotatable nature of the terminus portion provide a conformal contact between the conducting transmission line and the input and the output to form a circuit therebetween.

4. An armature for a micro-electro-mechanical switch having a torsion spring as set forth in claim 3, wherein the tines are constructed of a material selected from a group consisting of silicon nitride, Type III-V semiconductor materials, and silicon dioxide.

5. An armature for a micro-electro-mechanical switch having a torsion spring as set forth in claim 4, wherein the conducting transmission line is formed from a titanium adhesive layer and a gold conductor layer and an anti-diffusion layer therebetween.

6. An armature for a micro-electro-mechanical switch having a torsion spring as set forth in claim 2, wherein the conducting transmission line is formed from a titanium adhesive layer and a gold conductor layer and an anti-diffusion layer therebetween.

7. An armature for a micro-electro-mechanical switch having a torsion spring as set forth in claim 6, wherein the portion of the conducting transmission line exposed for electrical contact is in the form of a plurality of dimples, with a dimple corresponding to the contact to be made between the input and the output, respectively; whereby the dimples combined with the rotatable nature of the terminus portion provide a conformal contact between the conducting transmission line and the input and the output to form a circuit therebetween.

8. An armature for a micro-electro-mechanical switch having a torsion spring as set forth in claim 2, wherein the tines are constructed of a material selected from a group consisting of silicon nitride, Type III-V semiconductor materials, and silicon dioxide.

9. An armature for a micro-electro-mechanical switch having a torsion spring as set forth in claim 8, wherein the conducting transmission line is formed from a titanium adhesive layer and a gold conductor layer and an anti-diffusion layer therebetween.

10. An armature for a micro-electro-mechanical switch having a torsion spring as set forth in claim 1, wherein the portion of the conducting transmission line exposed for electrical contact is in the form of a plurality of dimples, with a dimple corresponding to the contact to be made between the input and the output, respectively; whereby the dimples combined with the rotatable nature of the terminus portion provide a conformal contact between the conducting transmission line and the input and the output to form a circuit therebetween.

11. An armature for a micro-electro-mechanical switch having a torsion spring as set forth in claim 10, wherein the tines are formed of the same material as the first beam structural layer and the beam structural layers are each constructed of a material selected from a group consisting of silicon nitride, Type III-V semiconductor materials, and silicon dioxide.

12. An armature for a micro-electro-mechanical switch having a torsion spring as set forth in claim 11, wherein the conducting transmission line is formed from a titanium adhesive layer and a gold conductor layer and an anti-diffusion layer therebetween.

13. An armature for a micro-electro-mechanical switch having a torsion spring as set forth in claim 1, wherein the conducting transmission line is formed from a titanium adhesive layer and a gold conductor layer and an anti-diffusion layer therebetween.

14. An armature for a micro-electro-mechanical switch having a torsion spring as set forth in claim 13, wherein the portion of the conducting transmission line exposed for electrical contact is in the form of a plurality of dimples, with a dimple corresponding to the contact to be made between the input and the output, respectively; whereby the dimples combined with the rotatable nature of the terminus portion provide a conformal contact between the conducting transmission line and the input and the output to form a circuit therebetween.

15. An armature for a micro-electro-mechanical switch having a torsion spring as set forth in claim 1, wherein the tines are constructed of a material selected from a group consisting of silicon nitride, Type III-V semiconductor materials, and silicon dioxide.

16. An armature for a micro-electro-mechanical switch having a torsion spring as set forth in claim 15, wherein the conducting transmission line is formed from a titanium adhesive layer and a gold conductor layer and an anti-diffusion layer therebetween.

17. An armature for a micro-electro-mechanical switch having a torsion spring as set forth in claim 1, wherein the insulating layer is formed as a layer on the substrate electrode.

18. An armature for a micro-electro-mechanical switch having a torsion spring as set forth in claim 17, wherein the portion of the conducting transmission line exposed for electrical contact is in the form of a plurality of dimples, with a dimple corresponding to the contact to be made between the input and the output, respectively; whereby the dimples combined with the rotatable nature of the terminus portion provide a conformal contact between the conducting transmission line and the input and the output to form a circuit therebetween.

19. An armature for a micro-electro-mechanical switch having a torsion spring as set forth in claim 18, wherein the tines are formed of the same material as the first beam structural layer and the beam structural layers are each constructed of a material selected from a group consisting of silicon nitride, Type III-V semiconductor materials, and silicon dioxide.

20. An armature for a micro-electro-mechanical switch having a torsion spring as set forth in claim 19, wherein the conducting transmission line is formed from a titanium adhesive layer and a gold conductor layer and an anti-diffusion layer therebetween.

21. An armature for a micro-electro-mechanical switch having a torsion spring as set forth in claim 17, wherein the conducting transmission line is formed from a titanium adhesive layer and a gold conductor layer and an anti-diffusion layer therebetween.

22. An armature for a micro-electro-mechanical switch having a torsion spring as set forth in claim 21, wherein the portion of the conducting transmission line exposed for electrical contact is in the form of a plurality of dimples, with a dimple corresponding to the contact to be made between the input and the output, respectively; whereby the dimples combined with the rotatable nature of the terminus portion provide a conformal contact between the conducting transmission line and the input and the output to form a circuit therebetween.

23. An armature for a micro-electro-mechanical switch having a torsion spring as set forth in claim 17, wherein the tines are constructed of a material selected from a group consisting of silicon nitride, Type III-V semiconductor materials, and silicon dioxide.

24. An armature for a micro-electro-mechanical switch having a torsion spring as set forth in claim 23, wherein the conducting transmission line is formed from a titanium adhesive layer and a gold conductor layer and an anti-diffusion layer therebetween.

25. An armature for a micro-electro-mechanical switch having a torsion spring as set forth in claim 1, wherein the set of tines includes a plurality of tines.

26. An armature for a micro-electro-mechanical switch having a torsion spring as set forth in claim 1, wherein the set of tines includes two tines.

* * * * *